United States Patent
Sasaki et al.

(10) Patent No.: US 10,933,495 B2
(45) Date of Patent: Mar. 2, 2021

(54) SOLDER PASTE CONTAINING SOLDER POWDER AND FLUX

(71) Applicant: KOKI Company Limited, Tokyo (JP)

(72) Inventors: Motohide Sasaki, Tokyo (JP); Takeshi Yahagi, Tokyo (JP); Noriyoshi Uchida, Tokyo (JP)

(73) Assignee: KOKI COMPANY LIMITED, Tokyo (JP)

( * ) Notice: Subject to any disclaimer, the term of this patent is extended or adjusted under 35 U.S.C. 154(b) by 165 days.

(21) Appl. No.: 15/576,539

(22) PCT Filed: Oct. 25, 2016

(86) PCT No.: PCT/JP2016/081621
§ 371 (c)(1),
(2) Date: Nov. 22, 2017

(87) PCT Pub. No.: WO2017/073575
PCT Pub. Date: May 4, 2017

(65) Prior Publication Data
US 2018/0147675 A1    May 31, 2018

(30) Foreign Application Priority Data

Oct. 26, 2015 (JP) ................. 2015-209954

(51) Int. Cl.
| | | |
|---|---|---|
| *B23K 35/36* | (2006.01) | |
| *B23K 35/02* | (2006.01) | |
| *B23K 35/362* | (2006.01) | |
| *B23K 35/26* | (2006.01) | |

(52) U.S. Cl.
CPC ...... *B23K 35/3615* (2013.01); *B23K 35/0244* (2013.01); *B23K 35/362* (2013.01); *B23K 35/262* (2013.01)

(58) Field of Classification Search
USPC ......................................................... 148/23
See application file for complete search history.

(56) References Cited

U.S. PATENT DOCUMENTS 8,070,045 B1    12/2011    Fleming et al.

FOREIGN PATENT DOCUMENTS

| CN | 102357748 | 2/2012 |
|---|---|---|
| JP | 4820604 B1 | 6/1973 |
| JP | 7116889 A | 5/1995 |
| JP | 952195 A | 2/1997 |
| JP | 2004158728 A | 6/2004 |
| JP | 2008110392 A | 5/2008 |
| JP | 2010-221260 | 10/2010 |
| JP | 102554517 | 7/2012 |

OTHER PUBLICATIONS

Siewert et al., "Database for Solder Properties with Emphasis on New Lead-free Solders," (2002), National Institute of Standards and Technology & Colorado School of Mines, Release 4.0 (Year: 2002).*
J-Plat Pat machine translation of JP S48-020604 (Year: 2020).*

* cited by examiner

*Primary Examiner* — Sheng H Davis
*Assistant Examiner* — Christopher D. Moody
(74) *Attorney, Agent, or Firm* — Clark & Brody LP

(57) ABSTRACT

Provided is a flux that contains at least one of an amine compound containing at least one acetylated amino group and an amino acid compound containing at least one acetylated amino group, as an activator.

1 Claim, No Drawings

SOLDER PASTE CONTAINING SOLDER POWDER AND FLUX

CROSS-REFERENCE TO RELATED APPLICATIONS

This application is the United States national phase of International Application No. PCT/JP2016/081621 filed Oct. 25, 2016, and claims priority to Japanese Patent Application No. 2015-209954 filed Oct. 26, 2015, the disclosures of which are hereby incorporated in their entirety by reference.

FIELD

The present invention relates to a flux and a solder composition using the flux.

BACKGROUND

Conventionally, bonding of electronic parts to a substrate has been done, for example, by using a solder composition composed of a solder powder and a flux (specifically, a solder paste). The flux for solder paste is formed by mixing a resin component (such as rosin), a solvent, a thixotropic agent, an activator, and other additives (such as a reductant) while dissolving them by heating.

The activator is used for removing oxide films on the solder surface, the electrodes of the parts, and the substrate pad. As the components of the activator, an amine compound or an amino acid compound, for example, may be used in some cases. (see Patent Literatures 1 and 2). The amine compound is known to exhibit high active force, and the amino acid compound is known to have both excellent active force and excellent storage stability in the solder paste. Examples of the amine compound used as an activator generally include ethylenediamine and diphenylguanidine. Further, examples of the amino acid compound used as an activator generally include valine and phenylglycine.

However, in the case of forming the solder paste using a flux containing an amine compound or an amino acid compound as an activator, the activator is oxidized to be burned due to reflow, as a result of which the hue of the residue of the activator becomes dark (the residual color is concentrated), and erroneous determination may possibly occur in quality inspection performed with reference to the hue. Further, in the case of using an amine compound as an activator, the amine compound has high reactivity with metals, and therefore there is a possibility of increasing the viscosity of the solder paste by the reaction of the amine compound with the solder powder during storage of the solder paste.

As a method for solving these problems, it is conceivable to limit the content of the activator in the flux, but the effects of the activator are reduced in such a case. Further, as a method for solving the problem occurring when using the amine compound as the activator, it is conceivable to add a chelating agent to the flux so as to suppress the reaction of the activator with the solder powder, but there is a possibility of impairing the unity of the solder powder by the chelating agent and reducing the wettability of the solder paste during reflow.

CITATION LIST

Patent Literature

Patent Literature 1: JP 2008-110392 A
Patent Literature 2: JP H9-052195 A

SUMMARY

Technical Problem

It is therefore an object of the present invention to provide a flux for a solder composition capable of allowing the solder composition to exhibit good wettability during reflow and suppressing darkening of the residual color (increase in residual color concentration) of the activator due to the reflow of the solder composition, and to provide a solder composition using the flux.

Solution to Problem

A flux according to the present invention contains at least one of an amine compound containing at least one acetylated amino group and an amino acid compound containing at least one acetylated amino group, as an activator.

Further, the amine compound is preferably at least one selected from N-acetylimidazole, N-acetylphthalimide, and tetraacetylethylenediamine.

Further, the amino acid compound is preferably at least one selected from N-acetylglycine, N-acetylleucine, and N-acetylphenylglycine.

A solder composition according to the present invention contains any one of the fluxes specified above and a solder alloy.

DESCRIPTION OF EMBODIMENTS

Hereinafter, embodiments of the present invention will be described.

The flux according to the present invention is applicable to a solder composition used by being mixed with a solder alloy (specifically, such as a solder paste and a flux-cored solder) and a liquid or solid flux (specifically, such as a post flux for flow soldering and a tack flux). The flux contains at least one of an amine compound containing at least one acetylated amino group and an amino acid compound containing at least one acetylated amino group, as an activator. In other words, the flux contains at least one of an amine compound and an amino acid compound which have a structure, with a nitrogen atom of an amino group of the amine compound or the amino acid compound being protected by an acetyl group, as an activator. The amine compound and the amino acid compound are preferably aliphatic compounds.

The amine compound is not specifically limited, and at least one selected from the group consisting of tetraacetylethylenediamine (N,N,N',N'-tetraacetylethylenediamine), N-acetylimidazole, N-acetylphthalimide, acetamidobenzoic acid (3-acetamidobenzoic acid and 4-acetamidobenzoic acid), N-acetylanthranilic acid, and acetamide nitrobenzoic acid (2-acetamide-6-nitrobenzoic acid, 3-acetamide-4-nitrobenzoic acid, 3-acetamide-2-nitrobenzoic acid, and 5-acetamide-2-nitrobenzoic acid) can be used, for example.

The amino acid compound is not specifically limited, and at least one selected from the group consisting of N-acetylphenylalanine (N-acetyl-L-phenylalanine, N-acetyl-DL-phenylalanine, and N-acetyl-D-phenylalanine), N-acetylglutamic acid (N-acetyl-L-glutamic acid), N-acetylglycine, N-acetylleucine (N-acetyl-L-leucine, N-acetyl-DL-leucine, and N-acetyl-D-leucine), and N-acetylphenylglycine (N-acetyl-N-phenylglycine, N-acetyl-L-phenylglycine, and N-acetyl-DL-phenylglycine) can be used, for example.

The content of the activator in the flux is not specifically limited and is preferably 3 mass % or more and 20 mass % or less, more preferably 5 mass % or more and 15 mass % or less, for example. Further, the content of the activator in the solder composition is not specifically limited and is preferably 0.1 mass % or more and 2 mass % or less, more preferably 0.5 mass % or more and 0.15 mass % or less, for example.

Other components contained in the flux are not specifically limited, and examples thereof include components generally constituting the flux. Examples thereof include a solvent, a resin component, a thixotropic agent, and a reductant.

The solvent is not specifically limited, and examples thereof include glycol ethers such as diethylene glycol monohexyl ether (hexyl diglycol), diethylene glycol dibutyl ether (dibutyl diglycol), diethylene glycol mono 2-ethylhexyl ether (2 ethylhexyl diglycol), and diethylene glycol monobutyl ether (butyl diglycol); aliphatic compounds such as n-hexane, isohexane, and n-heptane; esters such as isopropyl acetate, methyl propionate, and ethyl propionate; ketones such as methyl ethyl ketone, methyl-n-propyl ketone, and diethyl ketone; and alcohols such as ethanol, n-propanol, isopropanol, isobutanol, and octanediol. The solvent may be used alone, or a mixture of a plurality of types thereof may be used. In the flux for solder paste, use of the glycol ethers having a boiling point of 200° C. to 300° C. such as diethylene glycol hexyl ether, diethylene glycol monobutyl ether, and diethylene glycol dibutyl ether are preferable, among the aforementioned examples of the solvent, since optimal continuous printability can be ensured. Further, the use amount of the solvent is not specifically limited and is preferably 20 mass % or more and 90 mass % or less, more preferably 40 mass % or more and 55 mass % or less, with respect to the total mass together with the thixotropic agent, for example.

The resin component is not specifically limited, and rosin resins can be used therefor. Specifically, at least one rosin resin selected from the group consisting of rosin and rosin derivatives (such as hydrogenated rosin, polymerized rosin, disproportionated rosin, and acrylic acid-modified rosin) can be used. In particular, in view of cooling-heating cycle properties, hydrogenated rosin is preferably used. The use amount of the resin component is not specifically limited and is preferably 10 mass % or more and 80 mass % or less, more preferably 40 mass % or more and 60 mass % or less, with respect to the mass of the mixed material, for example.

The thixotropic agent is not specifically limited, and examples thereof include higher fatty acid amides such as amide thixotropic agents, hardened castor oil, beeswax, carnauba wax, and stearic acid amide.

The flux as described above forms a solder composition by being mixed with a solder alloy. The solder alloy is not specifically limited, and common solder powders can be used therefor. For example, powders of lead-free solder alloys such as Sn—Ag solders, Sn—Ag—Cu solders, Sn—Ag—Cu—Bi solders, Sn—Ag—In—Bi solders, Sn—Cu solders, Sn—Zn solders, and Sn—Bi solders, which are used as lead-free solders can be used therefor. The solder composition preferably contains the flux in an amount of 5 mass % or more and 20 mass % or less, more preferably 8 mass % or more and 15 mass % or less. Further, the solder composition preferably contains such a solder alloy (powder) in an amount of 80 mass % or more and 95 mass % or less, more preferably 85 mass % or more and 92 mass % or less.

As described above, the flux and the solder composition according to the present invention can allow the solder composition to exhibit good wettability during reflow and suppress darkening of the residual color of the activator (increase in residual color concentration) due to the reflow of the solder composition.

That is, since the acetylation of the amino group reduces the polarity of the amino group, the aforementioned solder composition that contains the solder alloy (powder) and the flux containing at least one of an amine compound and an amino acid compound as an activator suppresses the reaction between the solder alloy (powder) and the activator. Thereby, the reduction in wettability of the solder by the influence of the activator during reflow is suppressed, and therefore the solder composition having good wettability can be formed. Thus, the solder composition having excellent wettability with respect to various degraded metals such as tin, nickel, brass, and copper can be obtained.

Further, since the heat resistance of the activator is improved by the acetylation of the amino group, darkening of the residual color of the activator (increase in residual color concentration) due to burning of the activator during the reflow of the solder composition can be suppressed.

That is, the solder composition which exhibits good wettability and in which the increase in residual color concentration of the activator due to reflow is suppressed can be obtained by using the aforementioned flux containing at least one of an amine compound and an amino acid compound as an activator.

Further, since the polarity of the amino group is reduced by the acetylation of the amino group, the separation of the activator in the flux and the separation of the activator in the solder composition to be formed using the flux can be suppressed.

Further, since the heat resistance of the activator is improved by the acetylation of the amino group, the active force of the activator can be sustained even at the temperature during the reflow of the solder composition. Further, since the heat resistance of the activator is improved by the acetylation of the amino group, the dispersion of the solder composition due to bumping of the activator during the reflow of the solder composition can be prevented. Further, since the heat resistance of the activator is improved by the acetylation of the amino group, the occurrence of voids due to gases generated by degradation of the activator can be suppressed.

Further, since the acetyl group of the activator desorbs at about the solder melting temperature during the reflow of the solder composition to form acetic acid, a high active force is exerted due to the effects of the acetic acid and the amine or amino acid. This enables powerful removal of thick metal oxide films.

Further, since the amine compound is at least one selected from the group consisting of N-acetylimidazole, N-acetylphthalimide, and tetraacetylethylenediamine, the solder composition exhibits better wettability during reflow and the increase in residual color concentration of the activator can be suppressed more during the reflow of the solder composition.

Further, since the amino acid compound is at least one selected from the group consisting of N-acetylglycine, N-acetylleucine, and N-acetylphenylglycine, the solder composition exhibits better wettability during reflow and the increase in residual color concentration of the activator can be suppressed more during the reflow of the solder composition.

The flux according to the present invention is not limited to the aforementioned embodiments, and various modifications can be made without departing from the gist of the present invention. Further, it is, of course, that the configurations, methods, or the like, of the above-described plurality of embodiments may be optionally employed and combined (configuration, method, or the like, of one embodiment may be applied to configuration, method, or the like, of another embodiment).

EXAMPLES

Hereinafter, examples of the present invention will be described. However, the present invention is not limited to the following examples.
<Used Materials>
1. Resin component: acrylic acid-modified rosin (Product name: KE-604, manufactured by ARAKAWA CHEMICAL INDUSTRIES, LTD.)
2. Solvent: glycol solvent (Product name: hexyl diglycol, manufactured by Nippon Nyukazai Co., Ltd.)
3. Activator (aliphatic compound):
   Trans-2,3-dibromo-2-butene-1,4-diol (DBBD) (Product name: trans-2,3-dibromo-2-butene-1,4-diol, manufactured by Tokyo Chemical Industry Co., Ltd.)
   Levulinic acid (Product name: levulinic acid, manufactured by Tokyo Chemical Industry Co., Ltd.)
4. Activator (amino acid compound):
   Glycine (Product name: glycine, manufactured by Tokyo Chemical Industry Co., Ltd.)
   N-acetylglycine (Product name: N-acetylglycine, manufactured by Tokyo Chemical Industry Co., Ltd.)
   N-Boc glycine (Product name: N-(tert-butoxycarbonyl) glycine, manufactured by Tokyo Chemical Industry Co., Ltd.)
   L-valine (Product name: L-valine, manufactured by Tokyo Chemical Industry Co., Ltd.)
   N-acetylleucine (Product name: N-acetyl-DL-leucine, manufactured by Tokyo Chemical Industry Co., Ltd.)
   N-acetylphenylglycine (Product name: N-acetyl-DL-2-phenylglycine, manufactured by Tokyo Chemical Industry Co., Ltd.)
   Phenylglycine (Product name: DL-2-phenylglycine, manufactured by Tokyo Chemical Industry Co., Ltd.)
5. Activator (amine compound):
   N-Ac-imidazole (Product name: N-acetylimidazole, manufactured by Tokyo Chemical Industry Co., Ltd.)
   N-Ac-phthalimide (Product name: N-acetylimidazole, manufactured by Tokyo Chemical Industry Co., Ltd.)
   Tetraacetylethylenediamine (Product name: N,N,N',N'-tetraacetylethylenediamine, manufactured by Tokyo Chemical Industry Co., Ltd.)
   Ethylenediamine (Product name: ethylenediamine, manufactured by Tokyo Chemical Industry Co., Ltd.)
6. Solder alloy
   Solder powder (alloy composition: SAC305 "Sn-3Ag-0.5Cu" with a particle size of 20 to 38 µm)

<Production of Flux>

Using each of the aforementioned activators, a flux was prepared according to the formulation shown in Table 1 below.

TABLE 1

|  | Resin component | Active agent | Solvent |
| --- | --- | --- | --- |
| Flux formulation 1 (mass %) | 46 | 4 | 50 |
| Flux formulation 2 (mass %) | 45 | 5 | 50 |

<Production of Solder Composition>

Using each flux prepared according to the formulation shown in Table 1 above and the aforementioned solder powder, a solder composition (solder paste) was produced according to the formulation shown in Table 2 below.

TABLE 2

|  | Flux | Solder powder |
| --- | --- | --- |
| Solder composition formulation (mass %) | 11.5 | 88.5 |

<Evaluation of Wettability>

Using a pseudo substrate obtained by plating a glass epoxy substrate with each metal specified in Table 3, the aforementioned solder composition (solder paste) was printed thereon to a circular shape with a thickness (metal mask thickness) of 0.2 mm and a diameter of 6.5 mm. After the pseudo substrate with the solder paste printed thereon was heated under specific reflow conditions, dewetting was evaluated. As the reflow conditions, preheating was performed at 150° C. to 180° C. for 75 seconds, and main heating was performed at 220° C. or more for 40 seconds. The peak temperature was 235° C. APSR-257-VII, manufactured by KOKI TEC CORP., was used as a reflow device. The evaluation results for dewetting (DW) (evaluation results for wettability) are shown in Table 3 below, in which wet-spreading on the pseudo substrate was checked using the ratio obtained by dividing the actually wet-spread area by the printed area (binarizing the image of DW using a PC software and calculating the area ratio), and a wet-spreading on the pseudo substrate of less than 30% was evaluated as "1", 30% or more and less than 50% was evaluated as "2", 50% or more and less than 70% was evaluated as "3", 70% or more and less than 90% was evaluated as "4", and 90% or more was evaluated as "5".

<Evaluation of Residual Color>

Together with the aforementioned evaluation of wettability, the solder color after reflow was checked by visual inspection, and the degree of coloring (residual color) by burning (burning of the activator) was evaluated as "○", "Δ", or "x". The evaluation results are shown in Table 3 below. The symbol "○" means that the coloring was most thin, and the coloring was darkened in the order of "Δ" and "x".

TABLE 3

| | | Active agent | Wettability evaluation Metal plating | | | | Wettability | Residual color |
|---|---|---|---|---|---|---|---|---|
| | | | Copper | Nickel | Brass | Tin | | |
| Flux formulation 1 | C. Ex. 1 | DBBD | 1 | 4 | 1 | 1 | x | ○ |
| | C. Ex. 2 | Glycine | 1 | 5 | 1 | 4 | x | x |
| | C. Ex. 3 | N-Boc glycine | 2 | 5 | 3 | 5 | x | x |
| | Ex. 1 | N-acetylglycine | 3 | 5 | 4 | 5 | Δ | Δ |
| Flux formulation 2 | C. Ex. 4 | L-valine | 4 | 4 | 2 | 5 | x | x |
| | C. Ex. 5 | Phenylglycine | 4 | 4 | 2 | 3 | x | x |
| | C. Ex. 6 | Ethylenediamine | 3 | 3 | 3 | 4 | Δ | x |
| | C. Ex. 7 | Levulinic acid | 1 | 1 | 1 | 1 | x | ○ |
| | Ex. 2 | N-acetylglycine | 4 | 4 | 4 | 3 | Δ | Δ |
| | Ex. 3 | N-acetylleucine | 5 | 5 | 5 | 4 | Δ | ○ |
| | Ex. 4 | N-acetylphenylglycine | 5 | 4 | 5 | 3 | Δ | ○ |
| | Ex. 5 | N—Ac-imidazole | 5 | 5 | 5 | 5 | Δ | ○ |
| | Ex. 6 | N—Ac-phthalimide | 5 | 5 | 5 | 5 | Δ | ○ |
| | Ex. 7 | Tetraacetylethylenediamine | 5 | 5 | 5 | 5 | Δ | ○ |

SUMMARY

It is recognized from Table 3 above that exhibiting good wettability and suppressing the increase in residual color concentration of the residual color cannot go together in each of Comparative Examples, whereas good wettability was exhibited, and the increase in residual color concentration of the residual color was suppressed in each of Examples. That is, a solder paste having excellent wettability and suppressing the increase in residual color concentration of the residual color after reflow can be formed by using the flux that contains at least one of an amine compound containing at least one acetylated amino group and an amino acid compound containing at least one acetylated amino group as an activator, as compared to the case where an amine compound, an amino acid compound, or an aliphatic compound which are free from acetylated amino groups is used as an activator.

The invention claimed is:

1. A solder paste formed by mixing solder powder with a flux for solder paste, wherein
    a content of the solder powder being 80 to 90 mass % of the solder paste,
    the solder powder being at least one powder of solder alloys selected from a group consisting of Sn—Ag solders, Sn—Ag—Cu solders, Sn—Ag—Cu—Bi solders, Sn—Ag—In—Bi solders, Sn—Cu solders, Sn—Zn solders, and Sn—Bi solders,
    the flux for solder paste comprising at least one of an amine compound containing at least one acetylated amino group and an amino acid compound containing at least one acetylated amino group, as an activator,
    the amine compound being at least one selected from N-acetylimidazole, N-acetylphthalimide, and tetraacetylethylenediamine, and
    the amino acid compound being at least one selected from N-acetylglycine, N-acetylleucine, and N-acetylphenylglycine.

* * * * *